US005444433A

United States Patent [19]

Gropper

[11] Patent Number: 5,444,433

[45] Date of Patent: Aug. 22, 1995

[54] MODULAR EMERGENCY OR WEATHER ALERT INTERFACE SYSTEM

[76] Inventor: Daniel R. Gropper, 9908 Dale Ridge Ct., Vienna, Va. 22181

[21] Appl. No.: 207,537

[22] Filed: Mar. 7, 1994

[51] Int. Cl.[6] .............................................. G01W 1/00

[52] U.S. Cl. .................................... 340/601; 340/539; 340/309.15; 455/57.1; 379/37

[58] Field of Search .................. 340/601, 539, 309.15; 455/38.2, 38.4, 67.7, 57.1; 379/37, 38, 39, 40, 41, 48, 49, 50, 51; 381/119

[56] References Cited

U.S. PATENT DOCUMENTS

| | | | |
|---|---|---|---|
| 3,626,098 | 12/1971 | Lee | 379/51 |
| 3,975,583 | 8/1976 | Meadows | 348/460 |
| 4,031,467 | 6/1977 | Singleton | 455/57.1 |
| 4,524,243 | 6/1985 | Shapiro | 379/38 |
| 5,148,491 | 9/1992 | Sakamoto et al. | 381/119 |

OTHER PUBLICATIONS

The "Bearcat Alert" receiver—User's manual—1994.
ACC Reporter Controller Owner's Manual p. 8–4, Apr. 1987.

*Primary Examiner*—John K. Peng
*Assistant Examiner*—Julie Lieu

[57] ABSTRACT

This invention relates to an automatic, emergency or weather alert interface system between a first communication system, on which an emergency alert signaling tone is transmitted to indicate the occurrence of an emergence condition, and a second communication system, different from the first communication system. In operation, an emergency alert signaling tone is received from the first communication system by the emergency alert interface system which causes a prerecorded alert message to automatically be transmitted on the second communication system for an adjustable number of cycles wherein the audio from the prerecorded alert message is mixed with the audio from the second communication system so as to permit both audio messages to simultaneously be transmitted on the second communication system. Additional features taught herein include the transmission of a subaudible signaling tone on the second communication system to permit listeners on the second communication system to filter out all non emergency communication on that system until the subaudible signal is transmitted and the ability to permit a second communication system listener to access and link and the first communication system to the second communication system to permit immediate access to the alert message on the first communication system through the second communication system.

20 Claims, 5 Drawing Sheets

Fig- 2
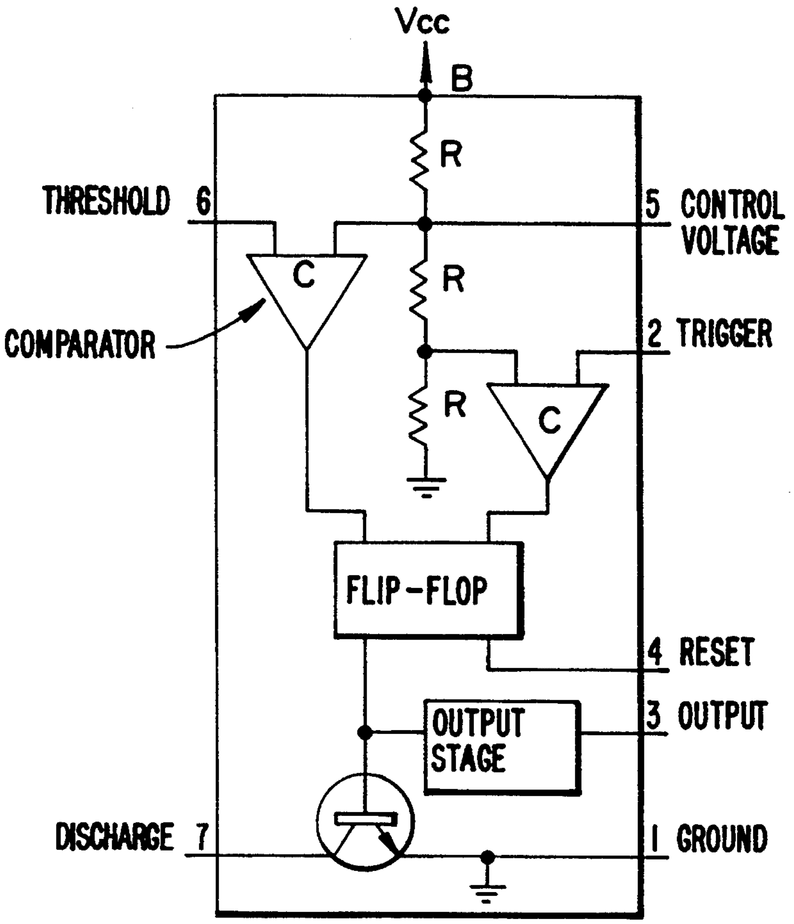
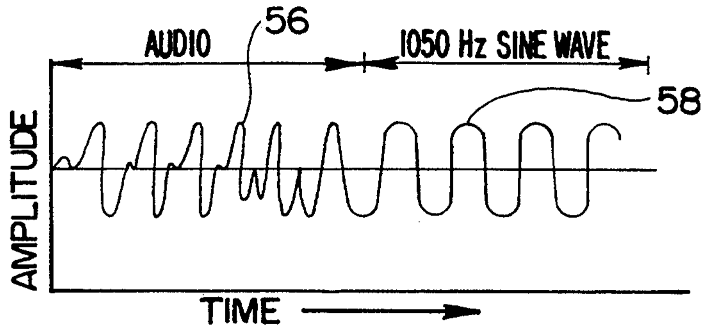
Fig- 6

MODULAR EMERGENCY OR WEATHER ALERT INTERFACE SYSTEM

FIELD OF THE INVENTION

An object of this invention is to provide an automatic emergency alert interface system between a first communication system and a second communication system to automatically alert listeners on the second communication system to check for an alert message on the first communication system.

Another object of this invention is to create a reliable, inexpensive, totally automatic and modular emergency alert interface system between the two communication systems.

Another object of this invention is to alert listeners on the second communication system of the alert issued on the first communication system while simultaneously not disrupting communication in progress on the second communication system.

Another object of this invention is to create a simple, versatile, modular alert interface system which will easily connect to existing second communication systems without much, if any, modification to the second communication system.

Another object of the invention is to incorporate subaudible signaling tones to remotely activate receivers on the second communication system upon activation of the emergency alert interface system by the first communication system.

Another object of the invention is to provide a means for using the emergency alert interface system on second communication systems, including radios, public address systems, commercial AM or FM broadcast radios, public safety (fire and police) communication systems and other communication devices such as cellular telephones.

Another object of this invention is to create an emergency alert interface system in which the alerting agencies, such as the National Weather Service, need to make no changes in their equipment or procedures currently in use to activate the emergency alert interface system.

Another object of this invention is to create an emergency alert interface system wherein listeners on the second communication system need to make no changes to their communication receiving equipment to be alerted to the emergency condition.

Another object of this invention is to permit the second communication system operator to select and change the warning message on the emergency alert interface system to meet the system's specific needs.

Another object of this invention is to permit listener access to the alert message on the first communication system through the second communication system.

Another object of this invention is to save lives and property through the notification of the public of the issuance of a weather or emergency warnings when they are outside and away from shelter, but still have access to a second communication system.

SUMMARY AND BACKGROUND OF THE INVENTION

Although this invention may be used as an interface between numerous emergency first communication systems, a primary application of this invention is between the United States Government's National Weather Service's (NWS) National Oceanic and Atmospheric Administration's (NOAA) Weather Radio, as the first communication system, and numerous secondary communication systems, including, but not limited to, school, office building or hospital public address systems, public utility and public safety (such as fire and police) radio systems, commercial land mobile communication systems, commercial AM or FM broadcast radios, marine band radio communication systems, amateur radio communication systems or just about any other type of communication system.

NWS forecast offices around the United States continuously broadcast taped weather messages which are repeated every four to six minutes and are routinely revised every one to three hours, or more frequently if needed. Most of the stations operate twenty-four hours a day. Under a January 1975 White House policy statement, NOAA Weather Radio was designated as the sole government operated radio system to provide direct warnings into private homes for both natural disasters and nuclear attack. This capability is to supplement warnings by sirens and by commercial radio and television. Due to the expense, unreliability and ineffectiveness of warning sirens, many siren systems around the country have been deactivated.

The NWS operates about three hundred and eighty (380) NOAA weather radio stations. Approximately ninety (90%) percent of the nation's population is within listening range of NOAA Weather Radio broadcasts. A similar network of about fifteen stations using the same frequencies broadcast continuous weather information across much of southern Canada.

NOAA Weather Radio broadcasts are made on one of seven high band FM frequencies ranging from 162.400 to 162.55 megahertz (MHz). These frequencies are not found on the average home radio now in use. However, a number of radio manufacturers offer special weather radios to operate on these special frequencies, with or without the emergency warning alarm.

During severe weather, NWS forecasters can interrupt the routine weather broadcast and substitute special warning messages. The forecasters will transmit an alert tone of 1050 Hertz (Hz) to activate specially designed NOAA weather radio warning receivers tuned to special NOAA weather radio frequencies. A single alert tone is normally transmitted for up to thirteen (13) seconds for selected watches and warnings.

Special alert receivers, upon detecting the NWS single alert tone, are usually configured to activate an audible siren alarm in the radio and/or open the squelch of the radio to let the listener hear the alert message and/or flash a signaling light, usually a light emitting diode or LED, to alert the listener that an alert has been issued.

The radios can be set in a latching mode meaning that the siren or light will flash or sound continuously until manually reset, or be set in an automatic reset mode, which will reset shortly after the alert tone is detected. Each of these alert modes has disadvantages. If the radio latches in the siren mode, the siren will sound continuously until the radio is manually reset. If the owner of the radio is away, the siren will be sounding unnecessarily for hours or even days. The usefulness of the alert is usually for a short period of a few minutes for a tornado or thunderstorm, up to a few hours for a winter storm. Therefore, since the majority of important alerts are useful for only a short time frame, it is not useful having the alert sound continuously for many hours or days. The siren tends to aggravate pets. The latching light is not audibly aggravating, but since these radios have no time stamp, the listener will not know when the alert was issued, one minute or one day earlier. Finally, the NWS tests the system at least once per week. Therefore, a latching alert system would latch in the alert setting at least once a week until reset.

If the system is not set in a latching mode, the listener will most likely miss the alert if the listener is not near the radio at the time an alert or test signal is issued.

These operational problems tend to drastically decrease the effectiveness of the alerting system. These defects will tend to cause the listener to turn off or ignore a potentially lifesaving time critical warning, which in the case of a tornado may be less than five minutes.

NOAA Weather Radio broadcasts can usually be heard as far as forty miles from the NWS transmitter site. The effective range depends on many factors including the height of the broadcasting antennae, the average surrounding terrain, quality of the receiver and type of receiving antennae. As a general rule, listeners beyond the forty mile range need a good quality receiver system if they expect to get reliable reception. An outside antennae may be required in these fringe areas. To reliably receive NWS alerts, listeners more than 40 miles from the transmitting antenna often need to spend a significant amount of extra money and effort setting up an outside antenna. Many NOAA weather radio listeners do not have the time, patience, money and/or expertise to put up such an antenna and accordingly may miss the warning message. Many dwellings do not permit outside antennas.

Another problem is that the reliability of the radios available to the general public is at best moderate due to a number of economic and engineering factors. The weather radios are required to be moderately priced by the requirement that the price needs to be low enough so that people will consider buying a special radio. If the price were extremely high, fewer people would be able to afford this important communication warning system. Since the receivers are required to be moderately priced in an effort to encourage wide distribution thereof, the engineering sensitivity and selectivity tends to be similarly moderate.

The invention taught herein overcomes many of the above described radio reception problems by placing a weather radio receiver at a central location with good reception, for example at a transmitter site. These sites are usually in high locations such on top of large buildings or mountains. Since only one installation needs to be set up, it becomes cost effective to invest in a special directional or yagi antenna to increase reception, if needed. Additionally, where applicable law permits the retransmission of weather radio on other frequencies, the second communication system effectively acts as a repeater for the NWS weather radio thereby increasing the effective range and coverage of the NWS transmitter without further cost or equipment. Instead of being limited to approximately a forty mile radius coverage from the NWS transmit antenna, the new area of coverage becomes the second communication system's area of coverage!

From experience, it has been found that most people who purchase weather radios locate them in their home or in an unattended office where the listener may not find out about an alert for hours or days after the alert until that person returns to the radio. When the importance of the alert requires a response time often measured in minutes, the fact that the alert was issued an unknown time (possibly hours or days) before being discovered makes the warning close to meaningless.

The time when a weather alert becomes extremely urgent is when people are away from their usual shelters and are out in their cars, boats, airplanes or are simply outside. In these circumstances, a weather alert radio sitting at home or in the office is essentially worthless.

Even if the weather radio is in an attended office, such as the principal's office of a school, it still takes a knowledgeable person to understand the meaning of the weather alert alarm, to find out the details of the alarm and to issue the appropriate warning over the public address or other alerting system. Often the knowledgeable person, for example the principal or secretary, will be away from the radio or will be busy with other matters when the alarm sounds thereby creating a potentially critical delay in relaying the weather alert message to the relevant public.

The invention described herein overcomes the majority of the above described handicaps in the NOAA weather radio alert system in a simple, inexpensive, and reliable manner.

Previously disclosed alerting systems, such as those disclosed in U.S. Pat. No. 4,031,467, entitled Alerting Process and System of Apparatus Therefor, usually require the use of expensive and dedicated special radio receivers and additional trained personnel to activate the special alerting system. For the reasons set out above, these are the very defects in the current alerting system.

Some repeater controllers have the capability of being modified to provide a weather alert feature. The RC-85 Repeater Controller, manufactured by Advanced Computer Controls, Inc. of Santa Clara, Calif., Owner's Manual, page 8-4, describes, in general terms, a weather alert feature. While the described weather alert feature will transmit an alert on the second communication system in response to an NWS tone alert, this system suffers from many defects.

The RC-85 alert message is transmitted once every fifteen (15) seconds. This period is non adjustable. It was found in trials that this was too often and was extremely annoying to the listeners. The invention described herein permits the user to adjust alert message timing cycle. From experience this was found to be optimally approximately once per minute.

The audio mix level between the alert message audio level and the second communication system audio is not independently adjustable on the RC-85. In practice, the RC-85 alert message level effectively blocked communication on the second communication system during each alert message, which occurred each 15 (fifteen) seconds during the alert cycle. For the alert system to be accepted by the users of the second communication system, it must not interfere with potential emergency communication on the second communication system. The feature of setting the audio level of the alert message at a level to not interfere with ongoing communication is not disclosed in the controller manual. Additionally, the feature on the controller to be used for the weather alert is primarily for a latching repeater site alarm which is meant to be loud to catch listener's attention without respect to permitting ongoing communication.

The RC-85 alarm, once activated, can only be deactivated by the use of a usually secure code usually held only by control operators of system. In most cases, the control operators will not be available to reset the system in the event of a malfunction or a test of the system. The proposed invention permits the alert to be instantly reset through the push of a button which can be conveniently (physically or functionally) located near the users to permit the system to readily be reset as needed.

Although not disclosed in the description of the alarm function, it is possible to preset the duration of the site alarm as a controller function, but it is not possible to set the repetition cycle which is fixed at fifteen (15) seconds.

The RC-85 has a limited digital prerecorded vocabulary and does not have the ability to record special alert messages such as those containing subaudible signaling tones or discrete alert messages to alert management of the alert without causing undo concern to the listening public. In practice, these customizing features are extremely important to making the alert system acceptable to listeners by not causing harmful interference to ongoing communication on the second communication system when the alert sounds.

The alert feature on the RC-85 is one subfeature of a repeater controller which usually costs near one thousand dollars. It would not be realistic to purchase a repeater controller only to receive weather alerts. The proposed invention likely has a cost of a small percentage of the cost of a repeater controller thereby making the proposed invention more likely to be adopted and used by the public.

In view of the above disadvantages, the RC-85, and similar controllers are not an acceptable substitute for the proposed invention. The terse description in the controller's owner's manual does not suggest the important features of the instant invention which have been found in practice to be the features that make the invention useful and acceptable to the listening public.

BRIEF DESCRIPTION OF THE DRAWINGS

FIG. 2 shows 555 specifications and an internal block diagram of the 555 integrated circuit.

FIG. 6 is a representative drawing of an electrical signal, as viewed on an oscilloscope, having one section of audible audio and one section of a modulated tone with a frequency of 1050 Hz.

DESCRIPTION OF THE PREFERRED EMBODIMENT OF THE INVENTION

Figure 1:
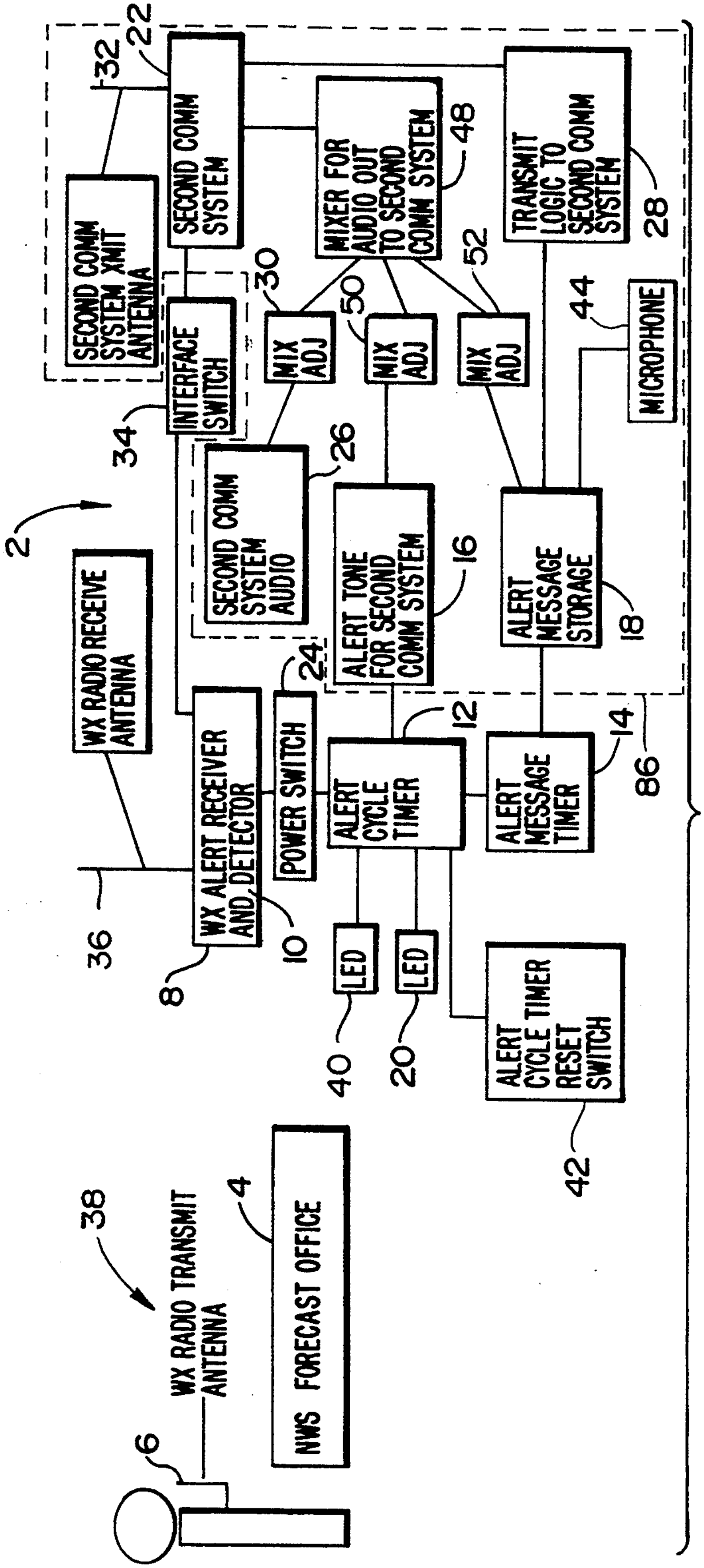
FIG. 1 is a system block diagram of the emergency alert interface system.
Figure 5:
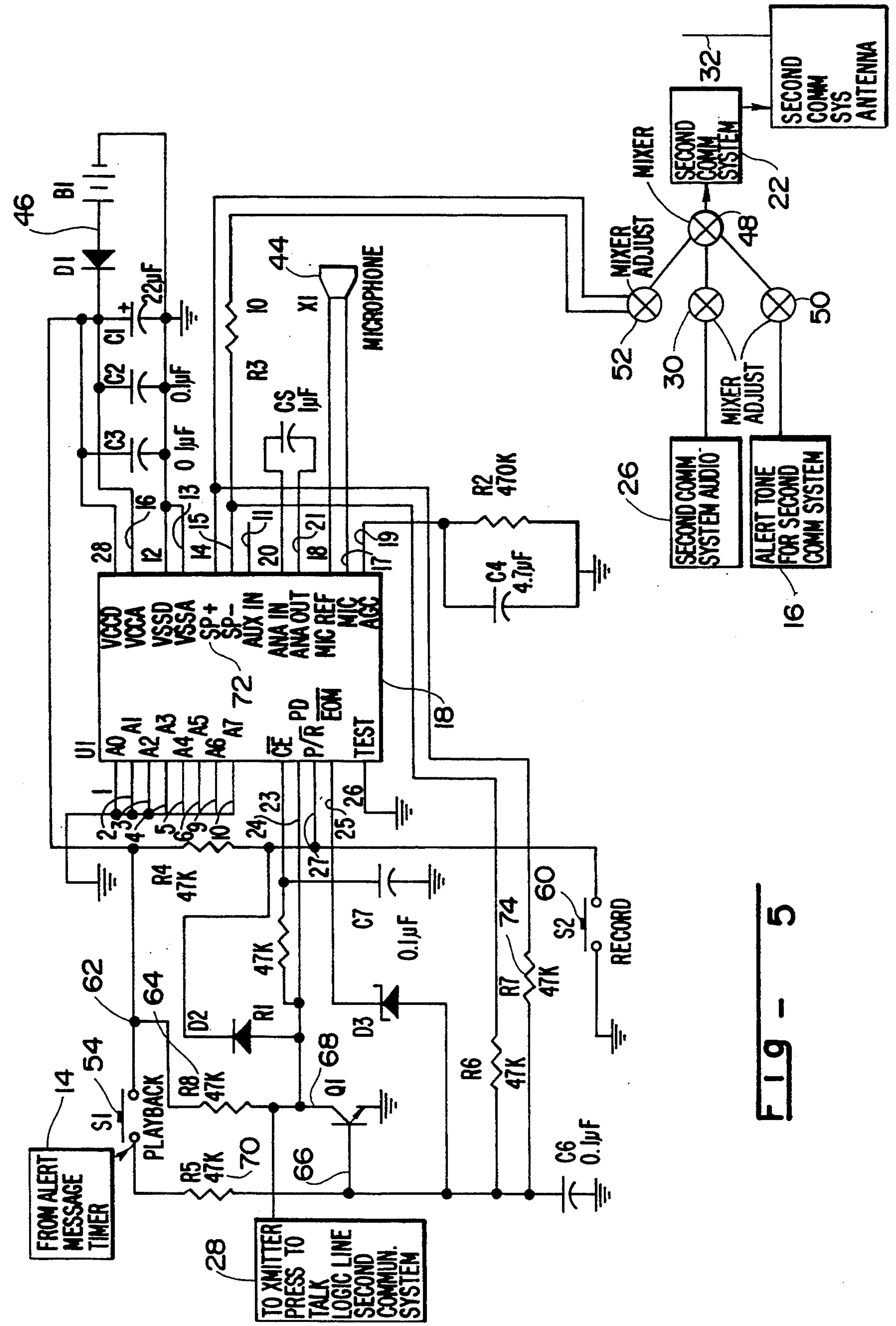
FIG. 5 is a schematic of a simple play/record circuit for the ISD 1000A DVR integrated circuit and the logic interface to the second communication system.

FIG. 1 is a system block diagram of the emergency alert interface system 2. Block 86 in FIG. 1 represents the components in FIG. 1 on which greater detail is shown in FIG. 5.

A representative NWS forecast office is designated 4 and the NWS/NOAA weather radio broadcast antenna is designated 6. It will be understood that the described emergency alert interface system 2 will work with any type of warning device which can be detected, whether it emanates from the NWS or from any other agency on any means including hardwire and radio.

For clarity, the remainder of this specification will relate to NWS/NOAA weather radio.

The emergency alert interface system 2 has a number of components. They include a commercially available NWS/NOAA weather alert radio receiver 8 having an alert signal detector 10 and a receive antenna 36. The alert signal detector 10 should be capable of detecting the alert signal from the first communication system, generally 38, and producing a voltage logic output (usually +5 volts or 0 volts) in response thereto. It will be understood that the weather alert radio receiver 8 and alert signal detector 10 can be any past, present or future communications technology capable of receiving and detecting an alert signal and producing a logic output in response thereto. The standard weather alert tone is a sine wave having a 1050 Hertz frequency. FIG. 6 is a representative drawing of an electrical signal, as viewed on an oscilloscope, having one section of audible audio 56 and one section of a modulated tone 58 with a frequency of 1050 Hz.

Figure 3A:
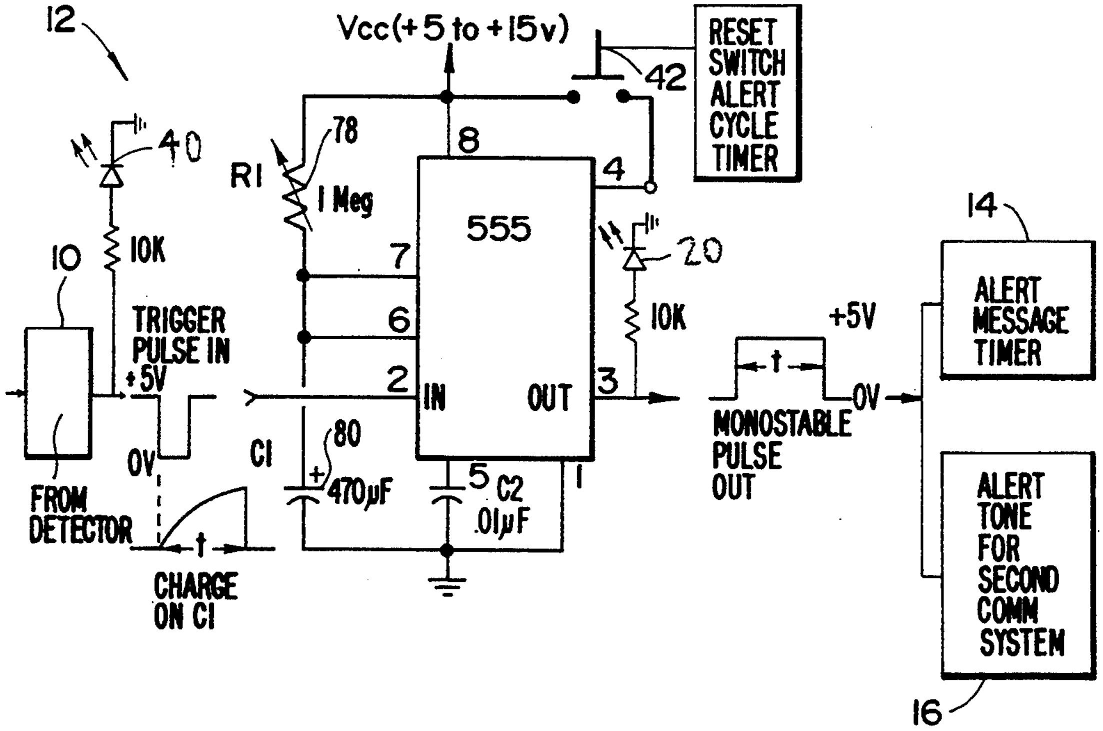
FIG. 3A shows the basic monostable timer circuit.
Figure 3B:
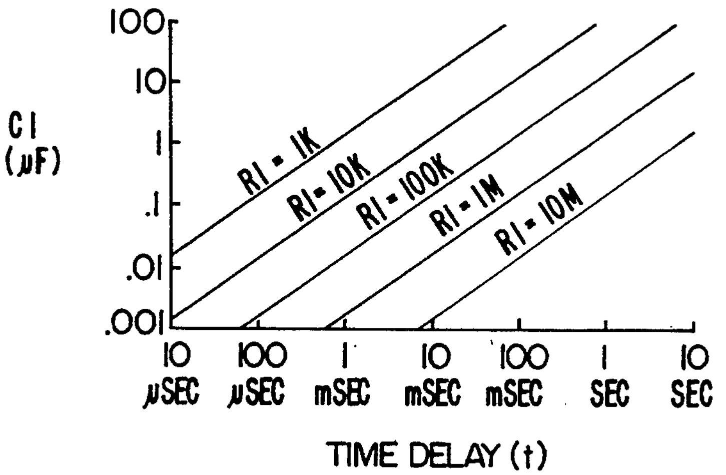
FIG. 3B shows the resistor/capacitor circuit reset cycle for the 555 timer in the monostable mode.

The logic output of the alert radio receiver is input into an alert cycle timer 12. The alert cycle timer 12 governs the length of time that the emergency alert interface system is in the alert mode, as opposed to being in the standby or ready mode. The alert cycle timer 12 may be of any conventional type of timer that can be activated by a logic signal, now known or hereinafter invented. As shown in FIGS. 2 and 3A, an inexpensive and reliable alert cycle timer 12 can be based on a 555 (or equivalent) timer integrated circuit wired in a standard and known monostable one shot mode. In practice, configuring the alert cycle timer 12 with an R-C circuit with a one megaohm potentiometer 78 and a 470 microfarad capacitor 80 will permit an adjustable, approximately ten (10) minute, alert timing cycle upon receiving a simple logic signal from the detector 10. A ten minute cycle, per alert, has been found to be the upper end of optimum for the alert cycle. FIG. 3B shows the resistor/capacitor circuit reset cycle for the 555 timer in the monostable mode.

For ease of servicing and for users to readily determine the status of the emergency alert interface system 2, status light emitting diodes 40 and 20 (LED) may be connected to the input and output of alert cycle timer 12. LED 40 is connected to the input of alert cycle timer 12 and shows that the alert system is powered up and ready to respond to an alert message. LED 20 is attached to the output of alert cycle timer 12 and shows that the system is in the alert mode. LED 20 will turn off when the alert cycle timer 12 resets.

A power shut down switch 24 for the alert cycle timer 12 should be included in the circuit between the alert detector 10 and the alert cycle timer 12. This switch should be remotely operable in the event that the alert system malfunctions. The switch can be any known type or hereinafter invented including relays and semiconductors. This is extremely important where the alert system is placed at a transmitter site which may be a great distance from the listeners. By shutting down power to the alert cycle timer 12, power is also instantly shutdown to the alert message timer 14 and the alert tone for the second communication system 16 thereby effectively and efficiently disabling the entire emergency alert system 2. The emergency alert system 2 is configured to permit the passive passage of audio from the second communication system 22 through the emergency alert system 2 even when the emergency alert system 2 is powered down in order to maintain the reliability of the second communication system 22 despite the status of the emergency alert system 2.

A 555 type integrated circuit can produce an output logic voltage and will also act as a source of output current. Using these features of the 555 integrated circuit, the output of the alert cycle timer 12 is used as a current source input for the alert message timer 14 as well as a current source for the alert tone for the second communication system 16.

Figure 4A:
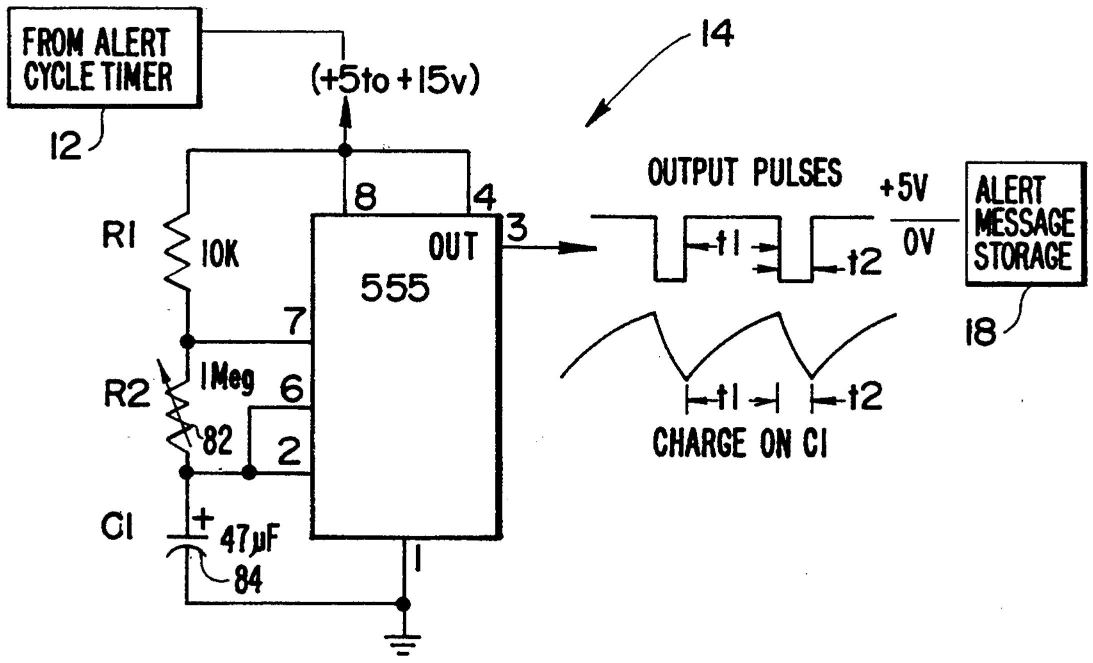
FIG. 4A shows a basic astable circuit based on the 555 integrated circuit.
Figure 4B:
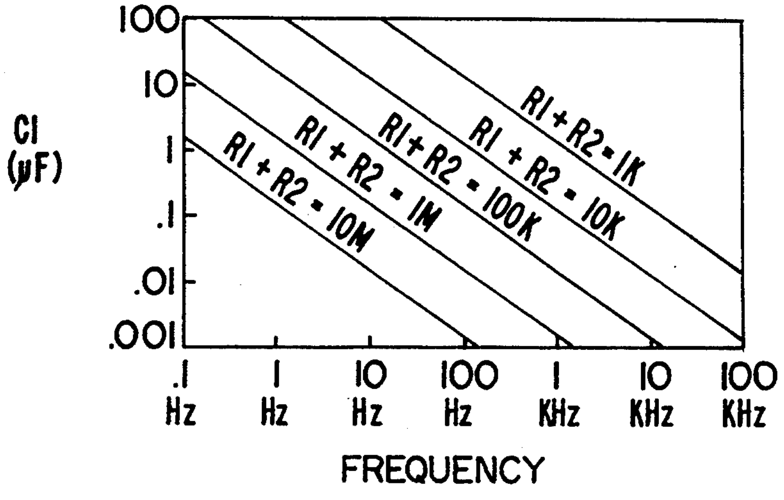
FIG. 4B shows the resistor/capacitor reset cycle for the 555 timer in the astable mode.

FIG. 4 shows a basic astable circuit based on the 555 integrated circuit. FIG. 3B shows the resistor/capacitor reset cycle for the 555 timer in monostable mode.

The alert message timer 14 is set up in a commonly known astable multivibrator mode. The alert message timer 14 is powered up only during the time the alert cycle timer 12 is active. The alert message timer 14 generates a logic pulse to the alert message 18 integrated circuit to start the transmission of a message cycle. It will be understood that any continuously cycling logic activated message recording device, such as a tape recorder, may be used in this circuit. A manual or remote alert cycle timer 12 reset switch 42 should be included in the system to reset the timer as needed, especially during the weekly test of the system. If the 555, or equivalent, timer is used, the standard timer reset switch configuration may be used as is shown in FIG. 3A.

The alert message timer 14 may be a 555 (or equivalent) integrated circuit with the circuitry to permit approximately a one (1) minute timing cycle during the time when alert cycle timer 12 is activated. Use of a one megaohm potentiometer 82 and a 47 microfarad capacitor 84 in a common astable multivibrator format as shown in FIG. 4A will permit an approximate one minute cycle, which has been found to be optimum. In this manner, the coordination of the ten minute cycle of the alert cycle timer 12 and the one minute alert message timer 14 permits the optimum output of an alert message generated on the second communication system 22 of once per minute for the ten minutes following the alert signal on the first communication system 12.

The alert tone 16 for the second communication system 22 is generated for the entire time (usually ten minutes) that the alert cycle timer 12 is active. In this manner, any communication during the ten minute alert period also has a subaudible alert signaling tone 16 as part thereof. In this manner, any listener who has the equivalent of tone squelch set on his or her radio receiver and who hears the receiver unsquelched, even during the approximately forty (40) seconds of each minute that the alert message 18 is not "playing" will immediately know that a tone alert has been issued on the first communication system 12. This is especially important where there is a time critical warning such as for a tornado.

Subaudible alert tone 16 may be generated by any known or hereinafter invented means including a special CTCSS tone generating board such as one produced by Communications Specialists. These boards are commonly commercially available in a multitude of frequencies. Such boards have a level adjust potentiometer to set the subaudible level to the correct overall output level.

It has been found that a digital voice recorder (DVR) chip is very effective for recording alert message 18. Many such chips are available and this technology is advancing forward at a dramatic rate. Any such chip now known or hereinafter invented in which approximately twenty (20) seconds of warning message may be placed upon and which will run thorough one message each time a logic signal is sent from alert message timer 14 can be used in emergency alert interface system 2. For reference, FIG. 5 is a schematic of a simple play/record circuit the ISD (Information Storage Devices) DVR integrated circuit called the ISD 1000A which may be used in the herein disclosed invention.

It is preferable to have the ability to record and change alert message 18 onto the DVR through pressing record button 60 and placing audio into electret microphone 44 connected to the DVR board. This enables the control operators to record custom messages for specific listening audiences. In commercial, amateur radio and public service (fire, police, ambulance, utility etc.) a two second audible alert tone followed by the words "Check for weather alert on 162.55 Megahertz" has been found to be an understandable and efficient alert message. The message may be customized for various services as needed. For example, acknowledging that the system is tested at least once a week, it may be preferable to have a more discrete alert message such as "Manager, check for code 99" where it is important to not unnecessarily frighten or panic specific listeners, such as shoppers in a department store. In such an instance, a manager or a clerk would be trained to check the NOAA weather radio to determine if the situation was a test or an actual emergency that would need to be tactfully publicly announced. The versatility of this emergency alert interface system 2 is the ability to adapt itself for numerous situations to be useful without being unnecessarily annoying or frightening.

It has been found that a battery back-up is important to preserve the readiness of the DVR recorded message, as well as to avoid false alerts due to momentary power failures. Placing a twelve volt lantern battery 46 in parallel with the power supply where the positive terminals of the lantern battery and the power supply are fed through a diode junction has been found simple and cost effective. In this manner, when the power supply drops below twelve volts due to a power failure, the twelve volt battery maintains the logic and integrity of the DVR, and the weather alert radio. Since the weather alert radio runs on nine volts instead of twelve volts, a simple nine volt fixed regulator may be used to convert twelve volts to nine volts to power the radio.

During each alert cycle, three audio signals are mixed. They are (1) the audio from the second communication system 26 by mix adjustments 30; (2) the alert tone for the second communication system 16 by mix adjustment 50; and the (3) alert message 18 by mix adjustment 52. The relative balance of these three audio levels is critical to the successful operation of the invention. The audio from the second communication system 26 is set at the normal level for effective communication. The alert tone for the second communication system 16 is set at about twenty percent (20%) deviation so as to reliably open squelches, but not so loud as to be noticeable to the listeners. The alert message 18 audio level is to be set at a level so as to mix into the background of any ongoing communication on the second communication system 26, but not so high as to interfere with ongoing communication. A fifty percent (50%) to seventy percent (70%) deviation level of the alert message 18 relative to the audio level of the second communication system 26 has been found effective. The combined and adjustably mixed audio is designated 48 and are input into the second communication system 22 and transmitted from the second communication system antenna 32. Any type of audio mixer now known or hereinafter invented in which the relative amplitude input levels are independently adjustable may be used with the invention taught herein.

To be completely automatic, the emergency alert interface system 2 must also key the second communication system transmitter 22 when the alert message 18 is playing. A simple method to accomplish this coordination is to derive the necessary logic 28 from the output voltage of alert message 18 digital voice recorder. Further reference is had to FIG. 5 an logic interface section 28 having the legend, "To Xmitter Press To Talk Logic Line Second Communication System." The reference line shows a connection from the press to talk logic line 28 of second communication system 22, to the collector 68 voltage of transistor O1. This voltage is normally held at logic high (normally +5 V) by Vcc 62 through 47K resistor R8 64. When O1 is energized, through O1's base 66, the logic output 28 connection to O1's collector 68 is brought to a logic low state (0 V). O1 can be energized manually, through playback switch 54 S1 and 47K resistor R5 70, or automatically, through the output voltage provided by Sp+72 (speaker+), when audio is present at the speaker output, as applied through 47K resistor R7 74. Thus, when O1 is energized, collector 68 voltage at O1 drops from 5 V to 0 V and press to talk logic line 76 for second communication system 22 is activated to permit alert message 18 to automatically be retransmitted on second communication system 22. Second communication system 22 is automatically unkeyed when alert message 18 has finished playing as a result of the voltage dropping to zero at SP+72 at the end of each play cycle.

From experience in actual high RF environment repeater sites, it is imperative that the commercially available weather alert radio intended for home use be encased in a RF resistant metal box to prevent desense and intermodulation from other strong, nearby transmitters which will potentially interfere with the reception by that receiver of NOAA Weather Radio. Using normal radio engineering techniques, it may be preferable to take the commercially available weather alert radio out of its plastic housing and to mount the pc board directly in a metal RF resistant metal enclosure.

Many commercial radio services, including the amateur radio frequencies, may permit the retransmission of NOAA Weather Radio broadcasts directly on second communication system 22. This may be accomplished by connecting speaker outputs of the NOAA weather alert radio 8 to second communication system 22 auxiliary input. Any presently or hereinafter invented method may be used to initiate the retransmission of NOAA weather radio over second communication system 22, generally designated 34. These may include a listener operated signal, such as DTMF, or another signaling tone or sequence. A timer should be placed in line to automatically terminate the rebroadcast after a set period of time. Means should also be provided to permit listeners to manually terminate the retransmission. Finally, the rebroadcast should be set to be in a subservient role to any other ongoing communication on second communication system 22 to avoid interfering with any primary communication on secondary communication system 22. In practice, it has been found that setting the rebroadcast to be completely and automatically overridden by audio on second communication system 22 to be acceptable since the rebroadcast information is a continuous tape which will repeat every few minutes and since this information is also available from a number of media sources.

From the above, it is apparent that this interface system is extremely simple to construct, is extremely versatile, and can easily be installed in a multitude of communication systems without much modification. Such a system would be extremely useful if placed at the transmitter of a public safety communications system such as police, fire or ambulance, or public utility communications system such as telephone, electric, or gas company. This system will enable the weather service to automatically alert the members of these vital public services of a impending weather alert without interfering with two way communications already in progress. An emergency alert interface system 2 may easily be placed on amateur radio repeaters, AM and FM commercial transmitters, marine band, land mobile, aviation, and any other conceivable communication systems to automatically alert listeners to an impending weather emergency which may directly affect the lives and property of listeners.

It will be apparent that numerous modifications of the above invention may be made without departing from the nature, intent, or spirit of the invention as claimed herein.

What I claim is:

1. A weather or emergency alert interface system comprising:

a. a first communication system;

b. a signaling tone transmitted on said first communication system;

c. a receiver, tuned to said first communication system, further comprising a detector to detect said signaling tone, wherein said detector generates a changed logic level output in response to detecting said signaling tone;

d. an alert cycle timer, having a controlled logic level output, wherein said alert cycle timer is activated by said changed logic level output from said detector, and wherein said logic level output of said alert cycle timer changes for a set period after said alert cycle timer has been activated by said changed logic level output from said detector;

e. an alert message timer, having a controlled logic level output, wherein said alert message timer is activated by said changed logic level output from said alert cycle timer, and wherein said logic level output of said alert message timer periodically pulses at preset intervals during the period when said alert cycle timer has been activated;

f. an audible prerecorded alert message, having an adjustable outgoing audio level, wherein said audible prerecorded alert message plays a complete message cycle in response to each logic pulse from said alert message timer;

g. a second communication system for transmitting an outgoing message, further comprising means for adjusting the audio level of said outgoing message;

h. means for mixing said adjustable outgoing audio levels of said audible prerecorded alert message and said outgoing message on said second communication system in such a manner as to enable listeners to said second communication system to simultaneously hear both audio messages;

i. means, electronically initiated by the activation of said alert message timer, for automatically keying the transmitter of said second communication system during the period when said audible prerecorded alert message is playing; and, j. means for transmission of said audible prerecorded alert message, mixed with said second communication system audio, on said second communication system, when said second communication system is keyed, for the duration of the activation of said alert cycle timer in time periods determined by said alert message timer.

2. A weather or emergency alert tone interface system, as recited in claim 1, wherein said first communication system is radio.

3. A weather or emergency alert tone interface system, as recited in claim 1, wherein said second communication system is radio.

4. A weather or emergency alert tone interface system, as recited in claim 1, wherein said alert cycle timer is an electronic timer.

5. A weather or emergency alert tone interface system, as recited in claim 4, wherein said alert cycle timer is based on a 555 timer.

6. A weather or emergency alert tone interface system, as recited in claim 1, wherein said alert message timer is an electronic timer.

7. A weather or emergency alert tone interface system, as recited in claim 6, wherein said alert message timer is based on a 555 timer.

8. A weather or emergency alert tone interface system, as recited in claim 1, wherein said audible alert message is electronically recorded.

9. A weather or emergency alert tone interface system, as recited in claim 8, wherein said audible alert message is electronically recorded on a digital voice recorder.

10. A weather or emergency alert tone interface system, as recited in claim 1, wherein said alert message further comprises an outgoing subaudible signaling alert tone.

11. A weather or emergency alert tone interface system, as recited in claim 1, wherein said second communication system is a maritime radio frequency.

12. A weather or emergency alert tone interface system, as recited in claim 1, wherein said second communication system is a public address system.

13. A weather or emergency alert tone interface system, as recited in claim 1, wherein audio information from said first communication system may be accessed by listeners on said second communication system through said second communication system.

14. A weather or emergency alert tone interface system, as recited in claim 1, wherein said second communication system is a public safety communication system.

15. A weather or emergency alert tone interface system, as recited in claim 1, wherein said second communication system is a public utility communication system.

16. A weather or emergency alert tone interface system, as recited in claim 1, further comprising a listener activated alert cycle timer reset switch.

17. A weather or emergency alert tone interface system, as recited in claim 1, wherein said first communication system is NOAA weather radio.

18. A weather or emergency alert tone interface system, as recited in claim 1, wherein said second communication system is land mobile radio.

19. A weather or emergency alert tone interface system, as recited in claim 1, wherein said signaling tone has a frequency of 1050 hertz.

20. A weather or emergency alert tone interface system, as recited in claim 1, wherein said audible prerecorded alert message may be changed by the system control operator.

* * * * *

UNITED STATES PATENT AND TRADEMARK OFFICE

CERTIFICATE OF CORRECTION

PATENT NO. : 5,444,433

DATED : August 22, 1995

INVENTOR(S) : Daniel R. Gropper

It is certified that error appears in the above-indentified patent and that said Letters Patent is hereby corrected as shown below:

On the title page, under item [56] Reference Cited: line 13,
Insert --Attorney - Daniel R. Gropper--

Signed and Sealed this

Second Day of January, 1996

Attest:

BRUCE LEHMAN

Attesting Officer

*Commissioner of Patents and Trademarks*